Figures 1, 2:
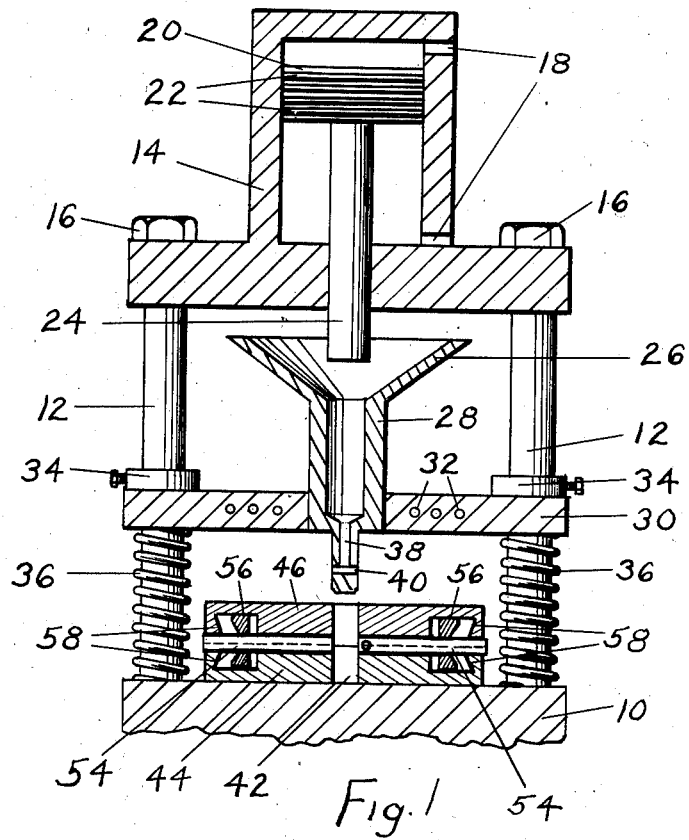

May 20, 1947.   K. J. KOPPLIN   2,420,709
SELF-LOCKING MOLD
Filed April 21, 1943   2 Sheets-Sheet 1

INVENTOR.
Karl J. Kopplin
BY Roy M. Eilers

Patented May 20, 1947

2,420,709

UNITED STATES PATENT OFFICE 2,420,709

SELF-LOCKING MOLD

Karl J. Kopplin, St. Louis, Mo.

Application April 21, 1943, Serial No. 483,970

6 Claims. (Cl. 18—43)

This invention relates to improvements in molding. More particularly the invention relates to improvements in molding articles under pressure.

In ordinary molding practice, the molten material may be poured into the mold and permitted to solidify. In such cases, no unusual degree of care need be given to the making and assembling of the mold because the molding is done at atmospheric pressure and leakage is not a serious problem. For instance in the molding of metal, the mold is made from "sand" and is provided with suitable gates and risers. The molten metal can be poured into the gates and thereupon it will flow into all parts of the mold. The molten metal will then, under the influence of gravity, assume a form complementary to the inner surface of the mold and upon cooling will retain that form. The weight of the molten metal is usually appreciable, and it cooperates with the force of gravity to cause a full and complete filling of the mold. As a result, pressure need not be used during the molding of molten metal. Furthermore in ordinary metal casting the piece must be machined afterwards, so imperfections in the surface of the molded piece are not too objectionable. This permits further latitude in the making and assembling of molds receiving molten metal.

In certain kinds of molding, however, pressures considerably above atmospheric pressures must be used to secure the flow of material into all the corners of the cavity in the mold. Examples of this kind of molding are found in the art of thermoplastic and thermosetting materials, and other examples of this kind of molding are found in the art of natural and synthetic rubber. To mold these materials it is necessary to heat them and to force them into the molds under heavy pressure. Furthermore it is necessary to maintain the heavy pressure for a short time until the material has assumed a non-fluid state, and then to maintain the material in the mold for a longer period until it has been hardened by heating or cooling. Some of these materials, as for example thermoplastic materials must be cooled in the hardening process; while other of these materials as for example thermosetting materials must be heated in the hardening process.

The pressures used in molding these materials are often quite high, and great care must be taken to maintain the sections of the molds in such tight relation that none of the material can leak out of the molds. Furthermore the sections of the molds must be tightly secured together to insure the proper dimensions for the molded articles. This is accomplished in present day molding processes by placing the molds under externally applied pressure during the molding process, and then maintaining this externally applied pressure until the material has hardened. This pressure is attained by the use of clamps or other devices that are secured to the injection machine and hold the sections of the mold in intimate engagement. While these clamps hold the sections of the mold securely enough, they prevent the removal of the mold from the molding machine until the material in the mold has hardened. In the case of some of the materials the hardening time is short, but in the case of other materials, and particularly in the case of natural and synthetic rubber, the hardening time is rather long. This is objectionable because it unduly limits the rate at which molded articles can be produced by any one machine, and in addition it limits the kinds of treatment to which the molded article may be subjected. For example it might be desirable to subject the mold and the material therein to prolonged heating at very high temperatures and then to chill it. However, this could not be done conveniently where the mold was clamped to the molding machine because the temperatures involved would affect the material to be molded. The present invention obviates these objections by providing a self-locking mold that can be filled and removed from the molding machine for subsequent heating or cooling. With such a mold the filling of the mold can be secured in a very short time, and the mold can then be removed from the machine and heated or cooled as desired. While the first mold is being heated or cooled, a second or third or fourth mold can be inserted in the molding machine for filling. This greatly increases the rate of production of molded articles and thereby reduces their unit cost. The present invention makes this possible by providing a mold with an internal locking device that can maintain the sections of the mold in intimate engagement without requiring the application of external pressure. It is therefore an object of the present invention to provide a mold with an internal locking device that will maintain the sections of the mold in assembled relation.

The present invention provides each section of the mold with inclined bearing surfaces and provides locking members that engage these surfaces. The locking members are arranged to be moved into engagement with the inclined bearing surfaces and thereby lock the sections of the mold together, and are arranged to be moved out of engagement with the bearing surfaces to release the sections of the mold. These locking members are preferably arranged so they move into locking position in response to the hydrostatic pressure employed in forcing the molding material into the cavities of the mold. Such an arrangement makes good use of the high pressures used in this type of molding and obviates the need of providing additional pressure means. This not only assures an intimate engagement between the sections of the mold, but it obviates the necessity of providing external clamping devices for the mold and thus makes it possible to remove the mold from the molding machine for subsequent heating and cooling. It is therefore an object of the present invention to use the hydrostatic pressure exerted on the molding material to clamp the sections of the mold together.

In the present invention, the clamping members preferably are arranged so they must be moved into clamping position before the molding material can flow into the cavities of the mold. This construction assures the attainment of a tight clamping engagement between the sections of the mold immediately before, during and after the molding material enters the cavities of the mold. As a result, uniform dimensioning of the molded articles is attained and leakage of molding material from the mold is obviated, because the sections of the mold are tightly clamped together before the material starts flowing into the cavities of the mold. It is therefore an object of the present invention to provide a mold with clamping members that must be moved into clamping position before the molding material can flow into the cavities of the mold.

In present day molding machines, the size of the mold is not only limited by the thermal capacity of the cylinders containing the material to be molded but is also limited by the amount of pressure that can be applied externally to the mold to clamp its sections together. In many cases the pressures used in the molding process are quite high and the externally applied pressure must be correspondingly high. Where the pressures in the mold are as high as twenty to ninety thousand pounds per square inch, the problem of providing externally applied pressure to maintain the sections of the mold in tight clamping engagement is a serious one. As a result, present day pressure molds are limited in size. This not only limits the size of the article that can be molded, but also limits the number of cavities in each mold. The present invention increases the size of the articles that can be molded and also the number of cavities in each mold by providing an internal clamping means that is actuated by the hydrostatic pressure of the molding material. These clamping means are preferably located adjacent the edges of the mold so they can seal the mold securely. With this arrangement, the greater the hydrostatic pressure that must be held by the mold, the greater the clamping ability of the clamping means. This permits the size of the mold to be greatly increased without any diminution in the completeness of the seal between the sections of the mold. It is therefore an object of the present invention to provide a self contained mold containing clamping means that exert a clamping pressure on the sections of the mold proportional to the pressure exerted on the molding material.

In present day molding machines, the molding material is heated in a cylinder and is forced therefrom into a mold. Because the present day molds cannot be removed from the molding machines until the molded article has hardened, and because such hardening often takes an appreciable time, the cylinders of present day molding machines must hold the heated molding material for appreciable periods of time. As a result, the heated molding material may, and often does, tend to burn or to harden in the cylinder. This is very objectionable since it halts production until the burned or hardened material can be removed from the cylinder and it may result in burned moldings. The present invention obviates this objection by decreasing the time between molding operations. This keeps the molding material from burning or hardening by decreasing the length of time the material must remain in the cylinder. It is therefore an object of the present invention to prevent burning or hardening of the molding material in the cylinder due to prolonged heating at rather high temperatures, by decreasing the time between molding operations.

Other objects and advantages of the invention will become apparent from an examination of the drawing and accompanying description.

In the drawing and accompanying description a preferred form of the invention is shown and described, but it is to be understood that the drawing and accompanying description merely illustrate and do not limit the invention and the invention will be defined by the appended claims.

In the drawing

Figure 3:
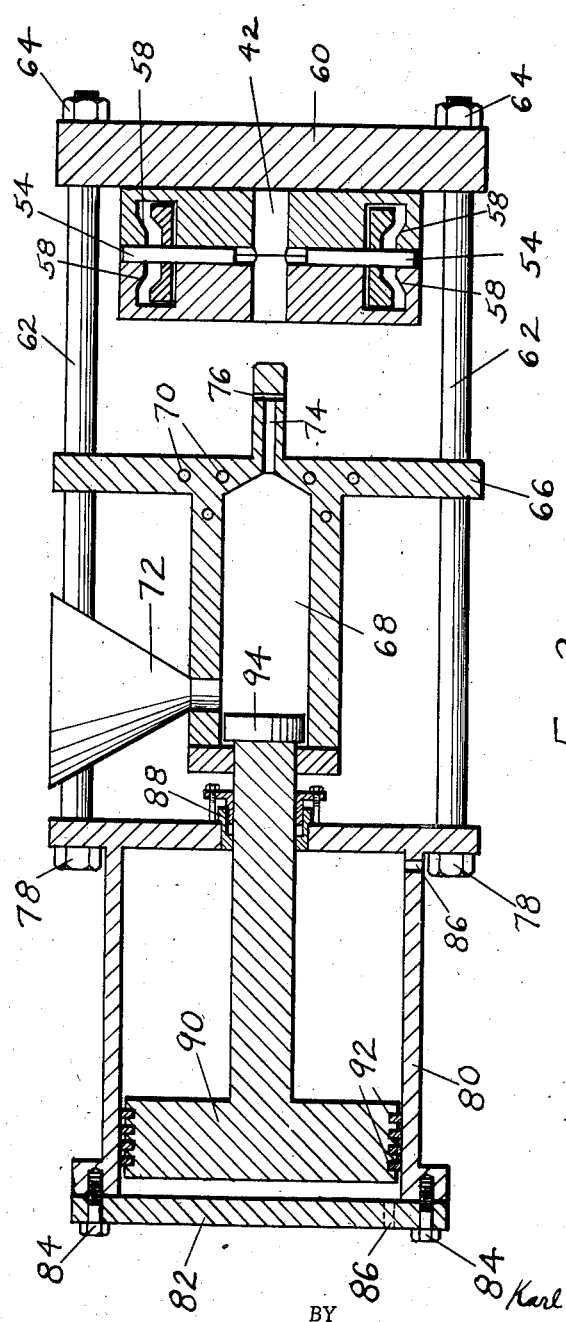

Fig. 1 is a partial cross sectional side elevational view of a molding machine and a mold to be used therewith, Fig. 2 is a partial cross sectional plan view of one section of the mold shown in Fig. 1, and Fig. 3 is a partial cross sectional side elevational view of another form of molding machine and the mold used therewith.

Referring to the drawing in detail, the foundation or base of a vertical molding machine is denoted by the numeral 10. Extending upwardly from the base 10 are a plurality of supporting rods 12 to which cylinder block 14 is secured by nuts 16. Cylinder block 14 is provided with ports 18 that may be connected to a suitable source of pressure, not shown. This pressure preferably will be hydraulic but it need not be since any suitable pressure means can be used. Positioned in, and reciprocable relative to, cylinder block 14 is piston 20 that is provided with piston rings 22. In the drawing, the cylinder block 14 is indicated as being unitary in construction, but of course the upper end thereof must be removable to permit the insertion of piston 20. In the same way the lower end must be provided with packing means to prevent the loss of hydraulic fluid. For the purposes of simplicity of illustration these features were omitted from Fig. 1 and are shown only in Fig. 3.

The vertical strain or supporting rods 12 are spaced apart, as shown, to permit the insertion of the molds between them. These rods not only support the cylinder block 14, they also act as guides for the heating and supporting member 30. The rods 12 may be spaced apart any desired distance, but are preferably spaced apart sufficiently to permit the ready insertion and removal of large molds into and from the machine. The supporting rods 12 are provided with locking washers 34 that can be fixedly secured to rods 12 and can thereby limit the upward movement of heating and supporting member 30. These washers are preferably set so the top of the cone shaped member 26 will always be spaced away from the bottom of the cylinder block 14 far enough to permit insertion of the molding material into the member 26. The washers 34 must also be set so the bottom of the nozzle is spaced far enough away from the base 10 to permit the ready insertion and removal of the molds.

A plunger rod 24 is connected to and movable with the piston 20, and this rod extends through the cone shaped member 26 into cylinder 28. Cylinder 28 is secured to and movable with heating and supporting member 30 and is heated by the steam or other heating medium that flows through the heating ducts 32. The member 30 is biased upwardly against locking washers 34 by helical springs 36 that enclose the lower portions of supporting rods 12; and molds can be inserted and removed quite readily while the member 30 is in the position shown in Fig. 1. The lower end of cylinder 28 is provided with an injection nozzle that consists of a vertical duct 38 and a horizontal duct 40. The injection nozzle has its lower end chamfered to facilitate its ready insertion into the opening 42 of the mold shown in Figs. 1 and 2. The horizontal duct 40 is positioned so that when the heating and supporting member 30 is pressed into engagement with the upper mold section 46, the horizontal duct 40 is in register with the passage 50. This assures proper filling of the mold and obviates any waste of molding material.

The mold shown in Figs. 1 and 2 consists of two sections 44 and 46 that contain cavities 48. The mold sections 44 and 46 also contain semi-cylindrical passages or ducts 50 that communicate directly with the opening 42 and communicate indirectly with each of the cavities 48 through passages 52. The openings 42 in the mold sections are preferably so dimensioned that they provide a snug fit between the nozzle and themselves. Such a snug fit prevents loss of pressure and also prevents leakage of the molding material. The snug fit might tend to cause the mold to move upward with the nozzle, and in such a case an auxiliary clamp may be provided on the base 10 to hold the mold while the nozzle moves upwardly. When the sections 44 and 46 of the mold are held in assembled relation the semi-cylindrical passages 50 are in register and form cylindrical passages. Positioned in passages 50 of mold sections 44 and 46, and movable with respect thereto, are reciprocating members 54. Members 54 are dimensioned to fill the major portion of the cross sectional area of the passages 50, whereby movement of molding material through passages 50 can only occur upon movement of members 54.

Adjacent the ends of members 54, and permanently secured thereto, are transversely extending clamping bars 56 that have inclined surfaces thereon. These inclined surfaces can be brought into engagement with inclined surfaces 58 of mold sections 44 and 46 by appropriate movement of members 54. When this is done, a clamping action occurs that prevents the separation of the mold sections 44 and 46. The members 54 are dimensioned longitudinally so that when they are in clamping engagement with the inclined surfaces 58 of mold sections 44 and 46 the outer ends of the members extend beyond the edge of the mold sections. The members 54 are also dimensioned so when they are not in clamping position the inner ends thereof block passages 52; so member 54 must be moved into clamping position before passages 52 are fully opened.

The inclined surfaces 58 can be set at any desired angle and the inclined surfaces of clamping members 56 will be set at a similar angle. To assure a tight clamping action, the internal dihedral angle formed by the inclined surfaces of member 56 should be slightly less than the internal dihedral angle formed by the inclined surfaces 58. As a matter of design, the smaller the internal dihedral angles of the inclined surfaces, the greater the clamping action of members 56 will be. Where the angle is quite small, a relatively small pressure on members 56 will be adequate to prevent the separation of the sections of the mold even though the pressure exerted on the molding material in the mold is quite high.

In Fig. 3 a horizontal molding machine is shown that consists of a base 60 provided with supporting rods 62. Supporting rods 62 are secured to base 60 by nuts 64. Movably supported on rods 62 is a heating and supporting member 66 that has a cylinder 68 secured thereto. The cylinder 68 is heated by steam, or some other heat transferring medium, that flows through the heating ducts 70. Adjacent one end of cylinder 68 is a cone shaped receptacle 72 for the molding material. Adjacent the other end and connected thereto is an injection nozzle that consists of a horizontal duct 74 and a vertical duct 76. The vertical duct 76 is so positioned that when the heating and supporting member engages the left hand mold section, the vertical duct 76 is in register with the passage 50. Fixedly secured to rods 62 by nuts 78 is cylinder block 80 which has a removable end 82 that is held in place by bolts 84. Cylinder block 80 is also provided with ports 86 and packing retainers 88. Positioned in cylinder 80 is a piston 90 that is provided with rings 92. Secured to and movable with piston 90 is a plunger 94 that reciprocates in cylinder 68. The chamfered nozzle of cylinder 68 extends into opening 42 in the mold that is positioned adjacent to the nozzle. This mold may be held in position by suitable stops, not shown, or by any means that permits ready insertion and removal of the mold into and from the mold. This mold is similar to that shown in Figs. 1 and 2 and is merely a deeper mold. The inclined bearing surfaces 58 of this mold are spaced away from the members 54 a short distance, but the clamping action is identical with that described in connection with the mold shown in Figs. 1 and 2.

The present invention can be used to mold thermosetting materials, thermoplastic materials, synthetic and natural rubbers, as well as other materials that will flow when they are heated and are subjected to pressure. When these materials are to be inserted into a mold, it is often desirable to place certain filler material in the mold before the molding material is introduced. This can be done quite easily before the two sections of the mold are assembled. Some of the filler materials that may be used are fibers of cotton, linen, glass, hemp, sisal, ramie, wood shavings, coarse sawdust and comminuted paper or pulp. Upon the introduction of molding material into the mold under high pressure, the filler material will be thoroughly impregnated or coated with the molding material.

The operation of each of these molding machines is quite simple. In the machine of Fig. 1, molding material is placed in the funnel shaped receptacle 26. This molding material may be in the form of chips, in the form of a powder, or it may be in liquid form. The molding material may be at room temperature or it may be heated. The preheating should preferably be in the range of from sixty to one hundred degrees centigrade and the exact temperature can best be determined in each individual case. The preheating is not absolutely necessary but it increases the production rate of the machine which might otherwise be limited by the rate at which heat could be introduced into heating ducts 32 and then transferred to the molding material in cylinder 28. If desired the cylinder 28 may itself be provided with a heating jacket that could add more than enough heat to the molding material. Such jackets are not in use today because overheating of the molding material prior to injection is quite a problem due to the long periods between molding operations. However with the much shorter periods, between molding operations, that are made possible by the invention, the cylinder 28 can be heated quite thoroughly. In such cases preheating may not be needed, but if it is desired or needed it can be done by heating the molding materials in suitable trays over suitable sources of heat.

The preheated molding material is additionally heated by heat from the medium in heating ducts 32, and is thus raised to the temperature at which the molding material can be made to flow freely upon application of heavy pressures. Hydraulic pressure is then exerted on piston 20 to force it to move downwardly against the molding material held in the funnel shaped member 26 and the cylinder 28. This downward movement of piston 20 exerts a force on the molding material and a consequent force on the supporting and heating member 30. The force exerted on member 30 by piston 20 is much larger than the force exerted on member 30 by helical springs 36, and will move the member 30 downwardly into engagement with the upper mold section 46. The mold has been placed on the base or foundation 10 so the opening 42 therein is in register with the chamfered nozzle on the lower end of cylinder 28.

As the member 30 moves into engagement with the mold, the nozzle will move downward until the horizontal duct 40 is in register with passages 50 and the lower surface of member 30 engages the upper surface of mold section 46. When the member 30 has been moved into engagement with the upper surface of mold section 46, it will exert a preliminary clamping pressure on the sections of the mold. This preliminary clamping pressure holds the sections of the mold together until the clamping bars 56 are moved into engagement with the inclined surfaces 58. As the piston 20 continues to move downwardly, the force that must be expended is much greater than the force required to move heating and supporting member 30 downward, because the molding material does not flow readily at low pressures. In some cases the pressure exerted on the molding material may be as low as five thousand pounds per square inch, and in other cases the pressure may be from twenty to ninety thousand pounds per square inch. When these large pressures are exerted on the heated molding material, that material will flow rapidly through the nozzle into the passages 50. As the molding material moves downward through the cylinder and out through the nozzle it will be heated by the heating medium in the heating ducts 32 and will also be heated by frictional heating due to its rather rapid movement. This frictional heating will raise the molding material to the desired temperature as it flows into the mold where it can then begin to harden.

As the molding material moves into the passages 50, it contacts the inner ends of movable members 54 and exerts pressure on them. This pressure forces the members outwardly and forces the clamping bars 56 into clamping engagement with the inclined surfaces 58. As the members 54 move outwardly they uncover the ducts 52 that lead to the cavities 48.

In the drawing the movable members 54 seem to occupy all of the cross sectional area of the passages 50. Actually the members 54 do not occupy all of this area since some clearance must be provided. Where desired, an unusually large amount of clearance may be provided between the exterior surface of the members 54 and the interior surfaces of the passages 50. Such a large amount of clearance will provide an additional locking means for the movable members 54. When the molding material has forced the movable members 54 out as far as they will go, it will work its way into the clearance space between the exteriors of members 54 and the interiors of passages 50. Where this occurs, the molding material will tend to lock the movable members 54 in the clamping position. As a result, when the pressure exerted on the molding material in the passages 50 by the material in the nozzle is relaxed, the members 54 will still be securely locked in clamping position.

Where the molding is to be done under excessively high pressures, it would be possible to improve this locking action by roughening the exterior surfaces of the members 54 or roughening the interior surfaces of passages 50. In fact the members 54 or the passages 50 could be provided with recesses that would receive and hold the molding material for locking purposes.

When the movable members have moved outwardly and have forced the clamping bars into clamping position, the molding material will flow through ducts 52 into the cavities 48. When the cavities have been filled, the molding material in the entire mold will be under very heavy pressure and as a result, it will conform closely to the configuration of the cavities 48. Furthermore it will act upon members 54 to exert a clamping action on surfaces 58 and thereby hold the mold sections in assembled relation. This is an efficient utilization of pressure already provided, and it obviates the necessity of providing additional pressure.

During this injection under heavy pressure, the molding material is compacted to its ultimate density. When the molding material has reached this density and has been held at that density for only a few seconds it becomes non-flowing. All pressure cannot be released from the molded article immediately however because the material has not fully hardened and its exposed surfaces will tend to "grow" although the body of the article will remain unchanged. As a result the article must be held in the mold for an appreciable time after it has reached its ultimate density. In present day molding machines this means that the machine is tied up for from fifty seconds to one or more minutes, but with the present invention the machine is ready for another mold in four or five seconds. The four or five seconds is the time required to fill the mold, compact the molding material to its ultimate density and permit it to become non-flowing. At the expiration of these four or five seconds, the heating and supporting member 30 is moved upwardly by the action of helical springs 58 and by the exertion of pressure on piston 20 until the nozzle leaves the opening 42. There will be no appreciable relaxation of clamping pressure on the sections 44 and 46 of the mold because the molding material is non-flowing and securely locks members 54 in the clamping position. The exposed surfaces of the molding material at the junction of passages 50 and opening 42 may "grow" somewhat, but the body of the molding material will not change upon the withdrawal of the nozzle from the mold.

Materials can be molded by this invention even though they tend to remain temporarily fluid after they have been compacted to their ultimate density. With such materials, the members 54 are roughened to secure maximum locking action with passages 50, and the ducts 52 are made tortuous or they are provided with constricted portions. The roughening of the members 54 and the tortuous or constricted design of ducts 52 could respectively prevent unclamping of the mold sections and flow of the molding material out of the cavities even though the molding material was in a semi-fluid state when the nozzle was withdrawn from the mold.

The filled mold can then be moved to heating or cooling chambers where it may be heated or cooled to the required degree of hardness. The mold can be left in the heating or cooling stages as long as is desired without reducing the production rate of the molding machine because other molds can be filled while the one mold is being treated. In the case of thermosetting materials, the mold may be heated for a considerable period of time and then allowed to cool gradually. This may be very desirable to permit the gradual equalization of internal stresses in the molded article.

When the molded article has hardened sufficiently the protruding ends of members 54 are struck by a hammer or other object and are forced inwardly of the mold. This can be done because when the nozzle was withdrawn from the mold it left an open space between the ends of the passages 50. When the outer ends of members 54 are struck by the hammer the plugs of molding material in the passages 50 will be forced into the hole 42. The forcing of the members 54 inwardly of the mold releases the mold sections and permits them to be separated. Ejector devices or knockout plungers of the type well known to those skilled in the art can be provided in the mold section to facilitate ready removal of the molded article from the mold sections.

The molds can be inserted in the molding machine by hand or they can be inserted and removed automatically. For instance the molds could be secured to a conveyor that would move them into register with the nozzle of the molding machine and then conduct them to heating or cooling stations. Another way of automatically filling the molds would be to mount the molding mahine on a pivot, mount the molds on a table and rotate the molding machine until it is in register with the respective molds.

By use of this invention a mold occupies space in the moldng machne for only about 4 or 5 seconds instead of 1 to 6 minutes, and it can be treated as long as desired without limiting the production of molded articles. Therefore one machine can service as many as 12 to 72 more molds than heretofore has been possible. Furthermore the molds can be made larger than has heretofore been possible, and this effects even greater savings and economies.

It may be desirable to preheat or precool the molds before the molding material is introduced into them. Ordinarily, molds for thermoplastic materials should be precooled before the molding operation and molds for thermosetting materials should be preheated. Such preheating and precooling may further decrease the length of time the mold must remain in the molding machine by decreasing the time required for the material to become non-flowing.

In the case of large molds for thermoplastic materials it is desirable to first heat them and then cool them. The initial heating of the mold is to prevent hardening of a portion of the material before the mold has filled completely, and the subsequent cooling is to secure proper hardening of the molded article. Where molds for thermoplastic materials are to be preheated, the molds should be provided with cooling means for ducts 52 and passages 50. The cooling could be obtained by providing air or water passageways around these ducts 52 and passages 50, and the cooling would form plugs of the thermoplastic material in ducts 52 and passages 50. These plugs would prevent unclamping of the mold sections and would also prevent the flowing of material out of the cavities. Once the plugs were formed in the ducts 52 and passages 50, the mold could be removed from the machine and placed in a cooling chamber.

Whereas a preferred form of the invention has been shown and described it is obvious to those skilled in the art that various changes may be made in the form of the invention without changing the scope of the invention.

What I claim is:

1. A substantially self-contained mold, adapted for use with machines that mold materials under pressure, that comprises a plurality of mold sections, said mold sections being engageable with each other to form at least one material-receiving cavity, an opening in the mold to permit the introduction of molding material into the mold, a passageway connecting said opening with said cavity whereby molding material introduced into said opening can move into said cavity, said mold having a recess in communication with said passageway, and mold-clamping means freely movable in said recess, said mold-clamping means being movable to one position to clamp the mold sections together and being movable to another position to free said mold sections for independent movement, said mold-clamping means being so positioned in said recess that material moving into said passageway acts upon said mold-clamping means to force the same to move into said one position to clamp said mold sections together.

2. A substantially self-contained mold, adapted for use with machines that mold materials under pressure, that comprises a plurality of separable mold sections, said mold sections being engageable with each other to form at least one material receiving cavity, an opening in the mold that is in communication with said cavity to permit molding material introduced into said opening to move into said cavity, said mold having a recess in communication with said opening, and mold-clamping means positioned in but being freely movable relative to said recess, said mold-clamping means having one portion thereof engageable with one of said sections of said mold and having another portion thereof engageable with another of said sections of said mold, said mold-clamping means being movable to one position wherein the said portions thereof can lock said mold sections together and being movable to a second position wherein said portions thereof can free said mold sections for independent movement, said mold-clamping means being so positioned in said recess that material moving into said recess from said opening acts upon said mold-clamping means to force the same to move into said one position to clamp said mold sections together.

3. A substantially self-contained mold, adapted for use with machines that mold materials under pressure, that comprises a plurality of separable mold sections, said separable mold sections being engageable with each other to form a material receiving cavity, an opening in the mold to permit the introduction of molding material into the mold, a passageway connecting said opening with said cavity whereby molding material introduced into said opening can move into said cavity, said mold having a recess in communication with said opening, and mold-clamping means freely movable in said recess, said mold-clamping means being engageable with each of said separable mold sections and being movable to one position to clamp the separable mold sections together and being movable to a second position to free said separable mold sections for independent movement, said clamping means being so positioned in said recess that material moving through said opening acts upon said mold-clamping means and subjects the same to the hydrostatic pressure exerted on the molding material, thus forcing the mold-clamping means to move into said one position to clamp said separable mold sections together.

4. A substantially self-contained mold, adapted for use with machines that mold materials under pressure, that comprises a plurality of mold sections, said mold sections being engageable with each other to form a material receiving cavity, an opening in the mold to permit the introduction of molding material into said mold, a passageway connecting said opening with said cavity whereby material introduced into said opening can move into said cavity, said mold having a recess in communication with said opening, and mold-clamping means freely movable in said recess, one of said mold sections having a clamping surface on the interior thereof, another of said mold sections having a clamping surface on the interior thereof, said mold-clamping means having holding surfaces thereon that are registerable with and are movable into engagement with said clamping surfaces on said mold sections to lock said mold sections together, said mold-clamping means being so positioned in said recess that molding material passing through said opening acts upon said mold-clamping means to force the same to move into locking position, said mold-clamping means being so dimensioned relative to said recess that movement of said mold-clamping means into locking position will leave a space in the recess adjacent the opening in said mold, which space is adapted to receive molding material that will solidify and maintain said clamping means in locking position.

5. A substantially self-contained mold, adapted for use with machines that mold materials under pressure, that comprises a plurality of separable mold sections, said separable mold sections being engageable with each other to form a material-receiving cavity in the mold, an opening in said mold that is in communication with said cavity whereby material introduced into said opening can flow into said cavity, said mold having a recess in communication with said opening and with the exterior surface of the mold, and mold-clamping means freely movable in said recess, said mold-clamping means having clamping surfaces thereon, said mold sections having holding surfaces thereon that are in register with and are engageable by the clamping surfaces on said mold-clamping means, said clamping surfaces on said mold-clamping means acting to lock said mold sections together whenever said clamping means is in one position and acting to free said mold sections for independent movement whenever said mold-clamping means is in a second position, said mold-clamping means having a portion thereof that projects out from said mold whenever said clamping means is in said one position, said mold-clamping means being movable to said one position by material introduced into said opening and being movable into said second position by movement of the projecting portion thereof.

6. A substantially self-contained mold, adapted for use with machines that mold materials under pressure, that comprises a plurality of separable mold sections, said separable mold sections being engageable with each other to form a material receiving cavity in the mold, an opening in said mold that is in communication with said cavity whereby material introduced into said opening can flow into said cavity, said mold having a recess in communication with said opening and with the exterior surface of the mold, and mold-clamping means freely movable in said recess, said mold-clamping means having clamping surfaces thereon, said mold sections having holding surfaces thereon that are in register with and are engageable by the clamping surfaces on said mold-clamping means, said clamping surfaces on said mold-clamping means acting to lock said mold sections together whenever said clamping means is in one position and acting to free said mold sections for independent movement whenever said mold-clamping means is in a second position, said mold-clamping means having a portion thereof that projects out from said recess and extends from the exterior surface of the mold whenever said mold-clamping means is in said one position, said clamping means having another portion thereof that is in communication with said opening of said mold but is spaced from said opening whenever said mold-clamping means is in said one position, said mold-clamping means being movable to said one position by material introduced into said opening and being capable of being held in said one position by said material when that material solidifies, said clamping means being movable into said second position by movement of the projecting portion thereof.

KARL J. KOPPLIN.

REFERENCES CITED

The following references are of record in the file of this patent:

UNITED STATES PATENTS

| Number | Name | Date |
| --- | --- | --- |
| 1,566,256 | Colvin | Dec. 15, 1925 |
| 1,916,495 | Shaw | July 4, 1933 |
| 1,888,613 | Apple | Nov. 22, 1932 |
| 1,919,534 | Shaw | July 25, 1933 |
| 2,319,479 | Ryder | May 18, 1943 |
| 1,674,387 | Campbell | June 19, 1928 |
| 1,375,660 | Kilborn | Apr. 19, 1921 |
| 1,981,580 | Biringer | Nov. 20, 1934 |